United States Patent [19]

Rodman

[11] Patent Number: 4,747,043

[45] Date of Patent: May 24, 1988

[54] MULTIPROCESSOR CACHE COHERENCE SYSTEM

[75] Inventor: Paul K. Rodman, Ashland, Mass.

[73] Assignee: Prime Computer, Inc., Natick, Mass.

[21] Appl. No.: 32,990

[22] Filed: Mar. 27, 1987

Related U.S. Application Data

[63] Continuation of Ser. No. 579,087, Feb. 10, 1984, abandoned.

[51] Int. Cl.$^4$ .............................................. G06F 15/16
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,581,291 | 5/1971 | Iwamoto et al. | 340/172.5 |
| 4,020,466 | 4/1977 | Cordi et al. | 364/200 |
| 4,077,059 | 2/1978 | Cordi et al. | 364/200 |
| 4,078,254 | 3/1978 | Beausoleil et al. | 364/900 |
| 4,084,231 | 4/1978 | Capozzi et al. | 364/200 |
| 4,142,234 | 2/1979 | Bean et al. | 364/200 |
| 4,167,782 | 9/1979 | Joyce et al. | 364/200 |
| 4,228,503 | 10/1980 | Waite et al. | 364/200 |
| 4,348,721 | 9/1982 | Brereton et al. | 364/200 |
| 4,373,179 | 2/1983 | Katsumata | 364/200 |
| 4,385,351 | 5/1983 | Matsuura et al. | 364/200 |
| 4,386,402 | 5/1983 | Toy | 364/200 |
| 4,394,731 | 7/1983 | Flusche et al. | 364/200 |
| 4,400,774 | 8/1983 | Toy | 364/200 |
| 4,410,941 | 10/1983 | Barrow et al. | 364/200 |
| 4,410,944 | 10/1983 | Kronies | 364/200 |
| 4,426,681 | 1/1984 | Bacot et al. | 364/200 |
| 4,426,682 | 1/1984 | Riffe et al. | 364/200 |
| 4,462,077 | 7/1984 | York | 364/200 |
| 4,463,420 | 7/1984 | Fletcher | 364/200 |
| 4,464,712 | 8/1984 | Fletcher | 364/200 |
| 4,530,054 | 7/1985 | Hamstra et al. | 364/200 |
| 4,530,055 | 7/1985 | Hamstra et al. | 364/200 |
| 4,574,346 | 3/1986 | Hartung | 364/200 |

Primary Examiner—Gary V. Harkcom
Assistant Examiner—C. H. Lynt
Attorney, Agent, or Firm—Lahive & Cockfield

[57] ABSTRACT

A cache coherence system for a multiprocessor system including a plurality of data processors coupled to a common main memory. Each of the data processors includes an associated cache memory having storage locations therein corresponding to storage locations in the main memory. The cache coherence system for a data processor includes a cache invalidate table (CIT) memory having internal storage locations corresponding to locations in the cache memory of the data processor. The cache coherence system detects when the contents of storage locations in the cache memories of the one or more of the data processors have been modified in conjuction with the activity those data processors and is responsive to such detections to generate and store in its CIT memory a multiple element linked list defining the locations in the cache memories of the data processors having modified contents. Each element of the list defines one of those cache storage locations and also identifies the location in the CIT memory of the next element in the list.

6 Claims, 2 Drawing Sheets

MULTIPROCESSOR CACHE COHERENCE SYSTEM

This application is a continuation of application Ser. No. 579,087 filed 2.10.84 now abandoned.

BACKGROUND OF THE INVENTION

The present invention relates to data processing systems, and more particularly to multiprocessor systems.

There are known computer architectures in which two or more data processors are linked to cooperatively utilize a common main memory. In such multi-processor systems, there are often operating conditions wherein a first processor might utilize information stored at a location in the main memory, modify that information internally and then write the modified information back to the original location in the main memory. While this process is going on, a second processor may also require updated information associated with the same location in the main memory. In order to accommodate such situations, multiprocessor systems must incorporate a protocol to permit each processor to know whether the information stored in the various main memories is stale or reflects current information.

In one particular prior art form, exemplified by the 850 System, manufactured by Prime Computer, Framingham, Mass., two data processors (DP-1 and DP-2) are coupled by way of a common memory bus (MB) to a main memory (MM). Each of the processors DP-1 and DP-2 includes a central processing unit (CPU-1 and CPU-2, respectively) and a local cache memory (LC-1 and LC-2, respectively). In this configuration, for example, each local cache memory may store an image portion of a program-to-be-executed which is stored in full in the main memory. The image program is stored in a format including a succession of words, each word having a tag portion, T, (representative of a page number, or high order location-defining bits in main memory) and associated data portions, D, (representative of the contents of the corresponding location in the main memory). In this format, the word number of each word in the stored succession in the cache memory is representative of the low-order location-defining bits in main memory. That is each local cache memory entry fully specifies a location in main memory, and the contents of that location. In operation, the local cache memories make this information available to their associated central processor, on request, on a high speed basis.

In this configuration, during operation, one data processor (DP-1) might modify the data associated with a main memory location in its local cache memory (LC-1). Since in the System 850, the local cache memories are "write-through" caches, the corresponding change is also written in the appropriate location in main memory. However, the other processor (DP-2) already may have stored the original contents of that location in main memory in its local cache memory (LC-2). Thus, unless the second data processor DP-2 is advised, it may request the information from its cache memory (LC-2) which is "stale"; that is, the requested information does not correspond to the "modified" information currently stored at the location in main memory.

In order to prevent the use of such stale information, systems in the prior art, such as the System 850, include a system for detecting changes in information in the local cache memories of each processor coupled to the main memory, and for identifying to the respective data processors the particular entries in their local cache memory which are stale (or invalid); that is, those entries which correspond to locations in main memory whose contents have been modified by another data processor. With such information, the CPU's of the respective processors, upon requesting an identified invalid cache entry, declare a "cache miss" condition and go directly to main memory to read the requested information.

In the prior art systems, there is, in effect, a table associated with each local cache memory, which table includes a succession of entries (or words) initially corresponding to the tag portions of each entry (or word) in the local cache memory. In addition, there is an LIFO (or FIFO) memory associated with each local cache memory. Each data processor is adapted to transmit a cache change signal (representative of the location in main memory of the change) on the memory bus each time a cache change is made in the local cache memory at that respective data processor. On "write through" cache systems like the Prime System 850, the cache change signal may be the normal write signal. There is a controller associated with each data processor which identifies each cache change signal on the memory bus, and upon such identification, stores a signal representative of the local cache memory location in the LIFO (or FIFO) register associated with the data processor. Thus, a cumulative record of cache changes is made in the respective LIFO (or FIFO) registers.

In operation, each data processor is adapted so that periodically, or in response to the execution of selected instructions, its associated LIFO (or FIFO) register is interrogated (on a LIFO or FIFO basis) so that the contents may be used by the data processor's CPU to identify which of the entries in its local cache memory is stale (or invalid).

Thus, with this prior art configuration, each data processor is apprised of changes in the data in the respective locations of the main memory. This may occur both in systems which have "write-through" local caches, or where the caches may just accumulate data changes which might be subsequently written to main memory in a batch.

While this prior art approach does permit the necessary intercommunication between processors, the use of a separate "tag table" memory (originally duplicating the local cache memory) and a necessarily (as a practical matter) large LIFO (or FIFO) memory to store all of the cache changes which may occur, requires a substantial amount of hardware, and associated circuit complexity. Further, due to the requirement to process each entry in the LIFO (or FIFO) registers separately (some of with may correspond to multiple changes in the same main memory location) results in unnecessary, and time consuming processing.

Accordingly, it is an object of the present invention to provide an improved multiprocessor system.

It is another object to provide a multiprocessor system which communicates the occurrence of local cache changes between processors on a hardware efficient basis.

Another object is to provide a multiprocessor system which permits multiple processors to timewise effectively identify changes in cache memory throughout the system.

SUMMARY OF THE INVENTION

Briefly, the present invention is a cache coherence system adapted for coupling to an associated "local" data processor of a multiprocessor system, particularly where the multiprocessor system includes that local data processor and one or more other data processors coupled to a common main memory. Each of the data processors includes an associated cache memory having storage locations therein corresponding to storage locations in the main memory.

The cache coherence system for the local data processor includes a cache coherence memory (referred to below as a cache invalidate table, or CIT memory) having internal storage locations corresponding to locations in the cache memory of the local data processor. In operation, the cache coherence system detects points in time, or occurances, when the contents of storage locations in the cache memories of the one or more of the data processors have been modified in conjuction with the activity those data processors. The cache coherence system is responsive to such detections to generate and store in its CIT memory a multiple element linked list defining the locations in the cache memories of the data processors having modified contents. Each element of the list defines one of those cache storage locations and also identifies the location in the CIT memory of the next element in the list.

The cache coherence system may be selectively operated by its associated data processor to sequentially process its stored linked list, element by element. As that list is processed, information of the list is provided to the coupled data processor, which in turn may identify which locations in its cache memory are presently storing stale (or invalid) data.

Thus, using a cache coherence system of the present invention in conjunction with each data processor in the multiprocessor system, each of those data processors may be apprised of changes in the main memory which have occured as a result of activities of the data processors in the multiprocessor system. Moreover, the linked list stored in the coherence systems establishes a highly efficient means for providing that information to the respective data processors. More particularly, there is no need to maintain a LIFO (or FIFO) type memory, as used in the prior art, which includes entries for all changes in the respective local cache memories. Furthermore, with the present invention, there is no need for maintaining a record of each change initiated by any of the data processors for any given main memory location, since the linked list established in the respective coherence systems requires only a single entry in the CIT memory upon detection of the first change at that location. No further changes need be identified to the respective data processors for subsequent changes written to that main memory location.

In one form of the invention, a multiprocessor system includes a main memory for storing main memory data at locations in that memory. The main memory is coupled to a memory bus for the multiprocessor system. A plurality of data processors, for example, n, where n is an integer greater than 1, is coupled to the memory bus. Each data processor includes a central processing unit (CPU) and a local cache memory adapted to store cache data at internal locations. That cache data is associated with main memory data stored in corresponding locations in the main memory. Each data processor is selectively operable for transferring cache data from selected locations in its local cache memory to its central processing unit. Each data processor is also selectively operable in conjunction with its central processing unit for generating cache data (for example, by retrieving cache data from the local cache memory), modifying that cache data, and writing the modified cache data to the local cache memory (and for a "write-through" cache system, writing the modified cache data to main memory).

Each data processor is coupled to an associated cache coherence processor (CCP). Each cache coherence processor includes a cache invalidate table, or CIT, memory adapted for storing a CIT data word associated with each of the locations of the local cache memory associated with that cache coherence processor. The cache coherence processors each have an associated detector for determining when new cache data is generated at the associated data processor and stored in its local cache memory, and also for determining the location in the local cache memory at which the new generated cache data is stored. In conjunction with the storage of new cache data in the local cache memory, a cache change signal which is indicative to the other data processors coupled to the bus of the location of the generated and stored new cache data in the local cache memory of the originating data processor. Each CCP is adapted to receive such cache change signals.

Each CCP is further adapted to load the CIT memory. To this end, the CCP's are selectively operable (in response to the central processing unit at their respective host data processor) to load the locations of their CIT memory with CIT data words corresponding to portions of the cache data at the respective locations in the host processor's local cache memory.

Each CCP is also selectively operable in response to a received cache change signal for modifying the contents of the location of the CIT memory corresponding to the determined location of the generated and stored new cache data indicated by the cache change signal. As a result of the latter operation, the CIt data word at the corresponding location of the CIT memory of a CCP is changed to a cache invalidate word. Each cache invalidate word includes a flag portion (or link bit) representative of the occurrence of the generation and storage of new data in that respective cache memory, and also includes a pointer portion representative of the location in the CIT memory storing the next previously stored cache invalidate word. Consequently, the cache invalidate words in the CIT memory collectively define a linked list, with each of those cache invalidate words including a portion identifying a set of locations (word numbers) in main memory for which cache data has been changed at one of the data processors, and the second portion pointing to the address (word number) of the next previously stored cache invalidate word in the CIT memory.

In this form of the invention, each of the data processors is selectively operable for identifying the locations in the CIT memory of its associated CCP having a flag portion (or link bit) stored therein. Each data processor is further adapted for identifying to its CPU those locations in its local cache memory corresponding to the locations of the associated CIT memory storing a flag portion. It is precisely those locations for which the local CPU recognizes that the data stored therein is stale. Thereafter, upon a request by its CPU for the data portion of the word stored at that location in the local cache memory, a cache "miss" condition is present and that the requested data read from main memory rather than the local cache memory.

In one form of the invention, each data processor includes an interrogation sub-system which is selectively operable in response to a request from its associated CPU for determining the substance of the linked list stored in the CIT memory. The interrogation sub-system initially identifies the location in the CIT memory of its associated CCP having the most recently written cache invalidate word. The data processor is then operative for that CIT location to identify the corresponding location in its local cache memory as being invalid (that is, containing stale data), addressed "location is replaced with a new current addressed location. Then, this process is repeated by the interrogation sub-system first identifying the location in the CIT memory, that is defined by the pointer portion of the cache invalidate word just processed stored followed by the host data processor identifying the corresponding location in its local cache memory as invalid. This interrogation process is repeated for each element in the linked list formed by the cache invalidate words in the CIT memory. In this manner, the data processor may selectively interrogate the CIT memory in an efficient manner utilizing the characteristics of the linked list of the CIT memory.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 3A shows a table representative of exemplary contents of a local cache memory in the system of FIG. 1; and FIG. 3B shows a table representative of exemplary contents of a CIT memory in the system of FIG. 1.

DESCRIPTION OF THE PREFERRED EMBODIMENT

Figure 1:
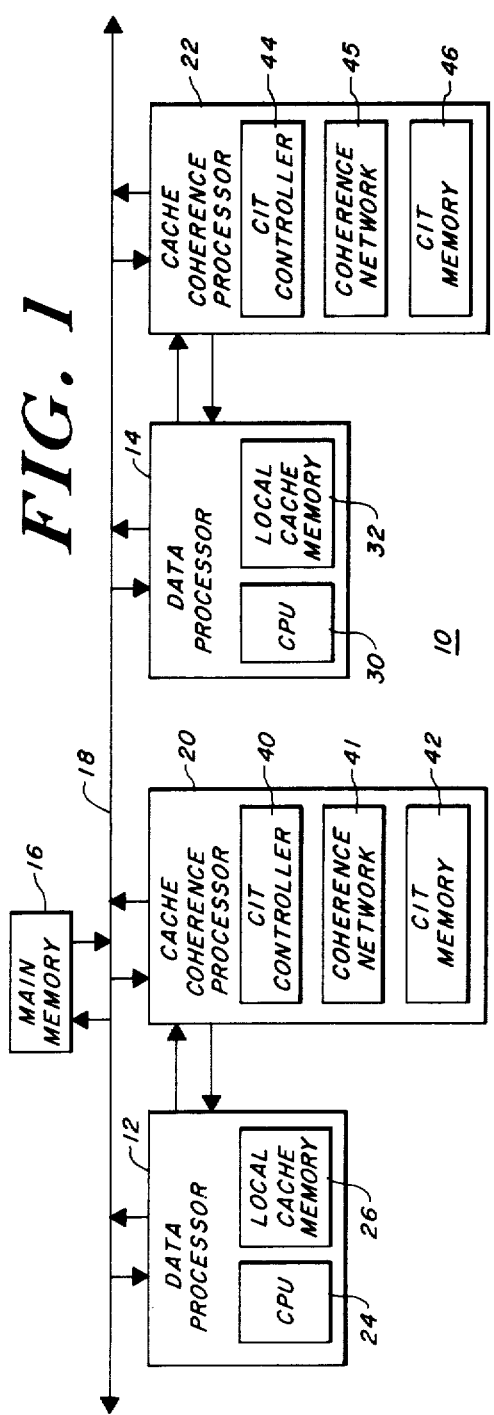
FIG. 1 shows in block diagram form an exemplary multiprocessor system embodying the invention.

FIG. 1 shows a multiprocessor system 10 embodying the present invention. The system 10 includes two data processors 12 and 14 coupled to a main memory 16 by way of the memory bus 18. In other embodiments, additional data processor may similarly be coupled to bus 18. The data processors 12 and 14 are respectively coupled to associated cache coherence processors 20 and 22. In the present embodiment, the cache coherence processors 20 and 22 are also coupled to bus 18. The data processor 12 includes a central processor unit (CPU) 24 and a local cache memory 26, and the data processor 14 includes a central processing unit (CPU) 30 and a local cache memory 32. The cache coherence processor 20 includes a cache invalidate table (CIT) controller 40, coherence network 41 and a CIT memory 42. The cache coherence processor 22 includes a CIT controller 44, coherence network 45 and a CIT memory 46.

In the illustrated embodiment, the data processors 12 and 14 are separate data processors, each of which may execute an independent stream of instructions. In operation, each of data processors 12 and 14 is responsible for its own full instruction decode, effective address calculation, instruction execution, and calculation of data for the next instruction. The data processors 12 and 14 may share one copy of an operating system which can be run on either data processor, as can any user program. The local cache memories generally contain an image of a portion of the main memory 16, to be provided on request to the associated CPU's on a high speed basis. The local cache memories are random access memories formatted so that each address of a location corresponds to the low order (word number) bits of a corresponding set of locations in memory 16. Each local cache location includes a tag field for storing a tag T (representative of the high order (page number) bits of an associated location in main memory 16), a validity/invalidity field for storing a valid (V) bit or invalid (I) bit (indicative of the validity of the cache data at that location), and a data field for storing data D (representative of the contents of that main memory location defined by the word and page number).

In function, the data processors 12 and 14, main memory 16 and memory bus 18 in the present embodiment are similar to the corresponding elements in the System 850 manufactured by Prime Computer, Inc., Framingham, Mass.

Generally, the data processors 12 and 14 interact with their associated coherence processors 20 and 32 to prevent stale information from being loaded from their respective local cache memories to their associated CPU's. Initally, each cache coherence processor maintains a record of the locations in main memory 16 for which data is stored in the local cache memory of its associated data processor, together with a copy of the validity/invalidity bit stored in association with each entry in the local cache memory. When a CPU data writes into a location in its associated local cache memory (so that the data content of that location differs from the data content originally at the corresponding main memory locations), that CPU also applies a write command signal together with signals representative of the main memory address and new data to the bus 18 in order to cause a corresponding write operation changing the data at the associated location of main memory 16. The write command signal, together with the main memory address signal are collectively referred to below as a cache change signal for use by other data processors coupled to the bus 18.

In the present embodiment, in response to a main memory write operation by a CPU, for example CPU 12, the contents of local cache memory 26 are changed only when the write operation affects a main memory location for which an image (or a corresponding entry) is currently maintained in the local cache memory 26. As a result, for the CCP 20, the write command (on bus 18) and the associated page and word location-defining signals (on bus 18) from a processor other than the host processor 12 constitute a cache change signal which initiates a change in the CIT memory. However, a cache change signal from the host processor 12 collectively includes those write and location-defining signals on bus 18 and, in addition, a local cache change signal directly from the host data processor 12 indicating that a change in the local cache memory has taken place.

Alternatively, in a write-allocate type system according to the present invention, any write operation by a CPU results in a change (inserting cache data) in its local cache memory. In the latter type system, since all write operations result in a change in local cache memory of the originating processor, a write command (on bus 18) and the word and page location-defining signals (on bus 18) provide the cache change signal for use by the cache coherence processor of the host processor, regardless of the data processor which initiated the write operation.

The respective cache coherence processors on bus 18 detect the occurrence of each cache change signal, and in turn indicate to their associated data processors that the contents of the corresponding entry in their respective local cache memories are stale (that is, invalid). When a cache location in one of the data processors 12 and 14 contains cache data that has been identified as stale, the respective data processor forces a memory read to the current information in the main memory 16 the next time that "stale" location is referenced.

Figure 2:
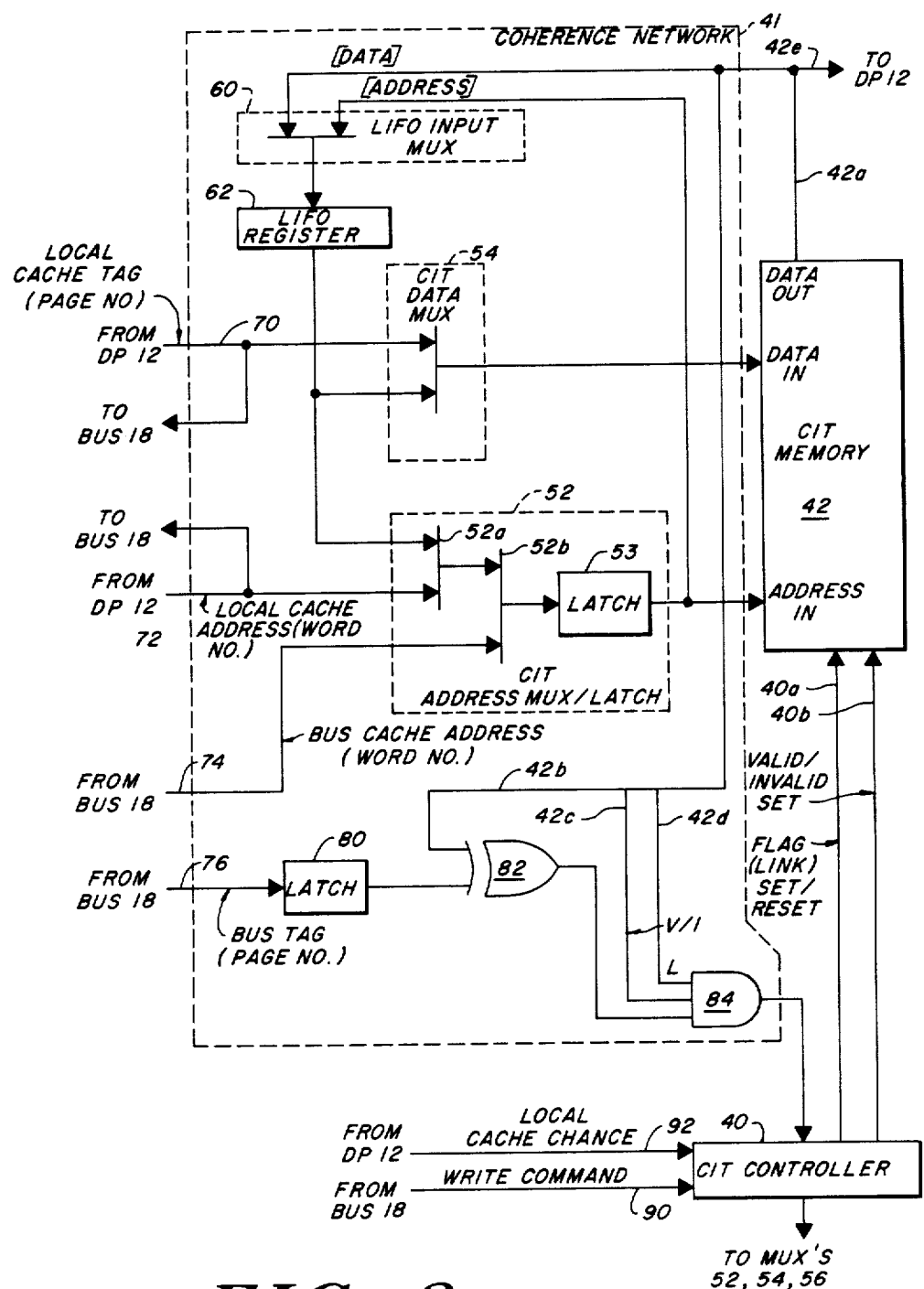
FIG. 2 shows in detailed block diagram form an exemplary cache coherence processor for the system in FIG. 1.

FIG. 2 shows a detailed block diagram of an exemplary form for the cache coherence processor 20. In FIG. 2, the CIT memory 42 is a random access memory. The network 41 includes a CIT address multiplexer (MUX) latch 52, a CIT data multiplexer (MUX) 54, LIFO input multiplexer (MUX) 60, a LIFO register 62, a latch 80 gate 82 and gate 84. The coherence network 41 provides an interface between CIT controller 40 and CIT memory 42. The CIT controller 40 generally controls the various multiplexers and timing to accomplish and coordinate the functions described below.

The address input to the CIT memory 42 is driven by the CIT address multiplexer/latch 52. The MUX 52 includes multiplexers 52a and 52b and latch 53. The data input to the CIT memory 42 is driven by the CIT data multiplexer 54. The output line from MUX 52 and the data out line 42a from the CIT memory 42 are applied as inputs to the LIFO input multiplexer 60 which in turn is coupled to the LIFO register 62. The LIFO register 62 provides an a first input to the CIT data MUX 54 and to the MUX 52a of the CIT address MUX 52. The output of MUX 52a provides a first input to MUX 52b. The output of MUX 52b is transferred by way of latch 53 to the address input port of the CIT memory 50.

The second input to the CIT data MUX 54 is provided by a local cache tag line 70 which maintains the high order (page number) address bits of a location in the local cache of the data processor 12. The second input for the MUX 52a is a local cache address line 72 which maintains the low order (word number) address bits of the location in the local cache of the data processor 12. The second input for the MUX 52b is the bus cache address line 74 which maintains the low order (word number) address bits of the cache change signal provided from the bus 16.

The high order (page number) address bits of the cache change signal from bus 16 is applied by way of bus tag line 76 to latch 80 which in turn is coupled to one input of gate 82. The second input of the gate 82 is provided by the data field portion 42b of the data out line 42a from the CIT memory 42. The output of gate 82 is coupled to a first gate 84. The validity/invalidity field portions (42c and 42d, respectively) of data out line 42a of memory 42 are coupled as further inputs to gate 84. The output of gate 84 is coupled to the CIT controller 40. Controller 40 has a flag (link) set/reset output line 40a coupled to the CIT memory 42. CIT controller 40 also has a first output driven by the write command line 90 coupled to bus 18 and a second output driven by a local cache change line 92 coupled to the data processor 12. With this configuration, the line 70 is coupled to the bus 16 to provide the local cache high order, or tag, address bits for a cache change signal generated for data processor 12, and the line 72 is coupled to the bus 18 to provide the low order, or word number address bits for that cache change signal. The write command signal of the cache change signal is applied to bus 18 by the CPU of processor 12.

In operation, generally, the CIT controller 40 initially controls the CIT data MUX 54 and the CIT address MUX/latch 52 to load the respective word locations in the CIT memory 42 with all of the tags and associated validity/invalidity bits currently resident at the corresponding locations in the local cache memory of the data processor 12. Thereafter, when any entry in the local cache memory 26 of data processor 12 is changed, a cache change signal is generated on bus 16 by way of lines 70 (page number), line 72 (word number), line 90 (write command) and line 92 (local cache change). In the illustrated embodiment, that cache change signal from data processor 12 initiates the modification of the contents of CIT memory 42.

When a cache change signal generated by data processor 14 is received on lines 74, 76 and 90 from the bus 18 (representing a change in the local cache memory 32) the CIT controller 40 initiates the modification of the contents of CIT memory 42. When a cache change signal is detected by CCP 20, MUX 53 is controlled to address the location (word) number in CIT memory 42 defined by the bus cache address line 74. The data from that location is applied by line 42b to gate 82 where it is compared to the bus tag from line 76. If there is not a match and if the flag (link) bit from line 42d has not been previously set and the validity bit from line 42c indicates that local cache memory 26 has valid cache data at that location, then gate 84 provides a "stale data event" signal to controller 40, indicating that the cache data at local cache memory 26 is now invalid. CIT controller 42 then provides a signal on line 40a which sets the flag bit in the addressed location of CIT memory 42 and controls MUX 54 to load the contents of LIFO register 62 in the tag field of the addressed location of CIT memory 42 (thereby changing a CIT data word to a cache invalidate word).

Thus summarizing, upon identification of a cache change signal, controller 40 controls the MUS 52 to address the word number location in CIT memory 42 corresponding to the address indicated by the cache change signal on line 74. At that point, the contents of LIFO register 62 (which as explained below, is representative of the (word number) address in CIT memory 42 of the most recently changed cache location) is loaded by way of the CIT data MUX 54 to the location addressed by the MUX/latch 52. In addition, the CIT controller 40 also loads an additional link bit, or flag, into the location addressed by MUX 52.

Following this operation, the (word number) address from the latch 53 is applied by way of the LIFO input MUX 60 and loaded into the LIFO register 62. The contents of register 62 are thus maintained to identify the preceding element in the linked list. As a result, upon the detection of the next cache change signal, the address of the CIT memory containing the most recently stored data is ready for entry to the CIT memory, in the manner described above.

During an CCP interrogation cycle by the data processor 12, the CIT controller 40 successively determines the elements of the linked list by reading out the contents of a flagged locations in CIT memory 42 by way of the LIFO in MUX 60. At this time controller 40 also resets the flag (or link) bit and sets the validity bit to invalid (I). Since each of the flagged locations in the CIT memory 42 include the address of the next previously stored flagged entry in the CIT memory 42 that address is transferred by way of LIFO register 62 to the input of MUX 52a which in turn is coupled through MUX 52b and latch 53 to address the next linked list element in the CIT memory 42. This process repeats throughout the linked list to successively generate signals representative of a succession of the identified local cache locations on line 42a which have been determined to hold stale cache data. The signals from this line 42a are transferred by way of line 42e to the data processor 12 where those signals are used by the CPU 24 to identify the stale data in the local cache memory 26. In response to each such received signal on line 42e, CPU 24 changes the valid/invalid bit of the corresponding word in its local cache 26 from valid (V) to invalid (I).

FIGS. 3A and 3B illustrate the operation of the data processor 12 and cache coherence processor 20. FIG. 3A illustrates exemplary contents of the local cache memory 26 in table form. In the present embodiment, the local cache memory 26 is a random access memory. The table in FIG. 3A illustrates the first 10 locations (or words) in the local cache memory 26. This table is formatted with low order bits corresponding to the word number, with each word number having a tag field (corresponding to the page number in the main memory 16), and a data field corresponding to the contents of main memory at the location defined by the tag and word number. In FIG. 3A, the tags are denoted the letter T followed parenthetically by the associated word number, and the data contents for the corresponding main memory location are represented by the letter D followed parenthetically by the number corresponding to the word number. In FIG. 3A, locations in memory 26 contain valid data and thus include a validity bit denoted by V. As described below, after an interrogation of the CIT memory to identify locations which have been determined to contain invalid data (that is, data which no longer represents the contents of the corresponding main memory location due to the activity of data processor 14), the valid/invalid field would be changed to include an invalidity bit denoted by I for each identified invalid entry.

In operation, initially, the local cache memory 26 is loaded with a portion of the contents of the main memory 16, with that portion corresponding to the set of cache data words T(i), D(i). These data words are provided to the CPU 24 of data processor 12 on request in a high speed manner.

From time to time, as the data processor 12 is apprised of changes in the contents of the corresponding locations of main memory 16 (that is, in conjunction with an interrogation of the CIT memory), the respective data words for those corresponding locations in the cache memory 26 are marked as invalid by changing the valid/invalid bit from V to I. In the example of FIG. 3A, no such interrogation takes place since any changes were made in a cache memory. When the CPU 24 requests cache data from one of the invalid local cache memory locations, a cache miss condition is determined to exist and, in response, the CPU 24 obtains the requested data directly from main memory 16, rather than from local cache memory 26.

FIG. 3B illustrates the contents of the CIT memory 42 for the example of FIG. 3A following the receipt from bus 16 of a succession of cache change signals indicative of changes made by data processor 26 in (word number) locations 2, 4, 6 and 9 in succession. In the present example of FIGS. 3A and 3B, the CIT memory 42 is shown to have CIT data words in locations 0, 1, 3, 5, 7, 8 and 10, with each of these words having a tag, a valid/invalid bit V and a flag (or link) bit set to 0. As shown, CIT memory 42 has cache invalid words in locations 2, 4, 6, and 9, with each of these words having a link bit set to 1, a CIT memory address, and a valid/invalid bit V. The table of FIG. 3B is formatted with a word location corresponding to each word location in the cache memory 26, with the low order bits defining word numbers in the same manner. Thus, the data field associated with each word number contains either a tag in the same format as stored in the cache memory 26, or CIT location word (denoted by a digit in FIG. 3B).

In operation, initially, the data field for the memory 42 includes tag words corresponding to all the tag words in the corresponding locations in the local cache memory 26. As data processor 14 changes the contents of the various locations its local cache memory (and also the corresponding locations of main memory 16), the data in local cache memory 26 becomes "stale" and the cache data words at the corresponding memory 42 locations defined by entries in the table of FIG. 3B are replaced with cache invalidate word. The CIT location portion of the cache invalidate word defines the word number of the location in the memory 42 storing the next previously entered cache invalidate word.

In the illustrated embodiment of FIG. 3B, initially, the tag/CIT location field contained the full set of tags T(i), with all the link bits set to 0 and all the valid/invalid bits set to V. At a point in time, cache coherence processor 20 determined that data processor 16 changed the contents of one of the locations in memory 16 having low order bits corresponding to word number 2. At that point in time, a corresponding cache change signal was generated by that data processor 16 which denoted the address 2 on bus cache address line 74. At that point, a reference word (denoted FIRST) stored in LIFO register 26 (at initialization) was transferred in by way of MUX 59 to word number 2 of CIT memory 42 (as addressed by latch 53) in memory 42. At that time, controller 40 wrote a 1 in the link bit field. The location word FIRST identifies the entry at word number 2 as the first stale data in the memory 42 since that memory was last interrogated by the CPU 12. In this exemplary configuration, the FIRST entry is arbituary since any signal, or no signal at all, can be used to denote the end of the linked list of cache invalidate words in memory 42. The cache address 2 is retained in latch 53 for use subsequently in loading the LIFO register upon the occurrence of the next main memory change as indicated to the cache coherence processor 20 by the next cache change signal.

In the example of FIG. 3B, this next occurrence corresponds to a change in word 4 of the data processor 16. At that point in time, word 4 of CIT memory 42 is loaded address 2 from the LIFO register 62 (with the link bit being set to 1 also). The next cache data change by processor 16 in the illustrated example is the location having low order bits corresponding to word number 6. As a consequence of this cache data change, the cache invalidate word at word number 6 was entered, with the CIT location word corresponding to location 4. The link bit was also set to 1 for word number 6. Similarly, the cache data change reflected in FIG. 3B is for word number 9, where the link bit was set to 1 and the CIT location word was entered for the location 6, corresponding to the next previously stored cache invalidated word. For this example, then, the memory 42 includes a linked list, at locations 2, 4, 6 and 9, with each element of the list having an identified flag (or link) portion and a location-defining portion, with the latter defining the location in memory 42 of the next previously entered element of the list.

This process continues for any location in memory 42 which corresponds to a change in the local cache memory of processor 12. In the event, for example, location having word number 4 is changed again, the CIT processor 40 identifies the contents of word number 4 of memory 42 and recognizes that the corresponding local cache data has already been determined to be stale, and no changes made in the memory 42 for this event.

With this configuration, the CPU 24 of data processor 12 may selectively interrogate various locations in the memory 42 of the CCP 20, or it may request that all of the elements of linked list defined therein be transferred sequentially back to the data processor 12 identifying invalid i.e., stale entries in the local cache memory 26. As each entry is transferred back to processor 12, the valid/invalid bits of both the local cache memory 26 and CIT memory 42 for that word number are set to I, and the flag (or link) bit is reset to 0.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A multiprocessor system comprising:
    A. a main memory means for storing main memory data at locations therein, and an associated memory bus coupled thereto,
    B. n data processors, where n is an integer greater than one, each data processor being coupled to said memory bus, and each data processor including:
        i. a central processing unit (CPU),
        ii. a local cache memory connected with said central processing unit and including means for storing cache data therein at internal locations, said cache data corresponding to main memory data stored in corresponding locations in said main memory,
        iii. means connected with said central processing unit and with said local cache memory for transferring cache data from selected locations in said local cache memory to said central processing unit,
        iv. cache data means connected with said central processing unit and with said local cache memory and being responsive to said central processing unit for generating cache data and for storing said generated cache data in selected locations in said local cache memory,
        v. detection means for each data processor and connected with said cache data means for determining when said cache data means stores said generated cache data in its local cache memory means and for determining the location of said generated cache data stored in the local cache memory,
        vi. cache change means for each data processor and connected with said detection means and responsive to a determination that said cache data means stores generated cache data in its local cache memory means, for generating a cache change signal, said cache change signal being representative of the location of said generated cache data stored in the local cache memory,
        vii. means connected with said memory bus for transmitting said cache change signal to said other data processors, said cache change signal being transmitted substantially concurrently with the generation and storage of cache data by said cache data means,
    C. n cache coherence processors (CCP's), each CCP being connected with a corresponding one of said data processors, and including:
        i. cache invalidate tag (CIT) memory including means for storing a CIT data word associated with each of the locations in the local cache memory associated with said CCP,
        ii. means connected with said memory bus for receiving said cache change signals from said other data processors,
        iii. means for loading said CIT memory including:
            a. means responsive to the CPU of the corresponding data processor for loading said locations of said CIT memory with CIT data words corresponding to the cache data at the respective locations in said local cache memory associated with said CPU,
            b. means responsive to a cache change signal received from another said data processor for modifying the contents of a location of a CIT memory corresponding to the location of said generated cache data of said other data processor, whereby said location of said CIT memory stores a linked list of cache invalidate words, each cache invalidate word including a flag portion representative of the occurrence of said generation and storage and including a pointer portion representative of the location in said CIT memory storing the next previously stored cache invalidate word.

2. A multiprocessor system according to claim 1 wherein each of said data processors further includes:
    A. CIT means connected with the associate CCP for identifying in the associated CIT memory linked list locations having a flag portion stored therein, and
    B. cache means connected with the local cache memory of the data processor for identifying the locations corresponding to the linked list locations in said associated CIT memory that store a flag portion therein.

3. A multiprocessor system according to claim 2 wherein said cache means includes means for successively determining the identity of each of said linked list locations from the pointer portion of the next previously stored cache invalidate word.

4. A multiprocessor according to claim 1 wherein said cache change means includes means for transferring said cache change signals to each CCP at least in part by way of said memory bus.

5. A cache coherence system according to claim 1 further comprising means coupled with one of said data processors and responsive thereto for sequentially processing said stored linked list element by element, and for communicating to said coupled data processor the locations in said cache memories having changed contents defined by said linked list.

6. A cache coherence system according to claim 5 further comprising:

means for detecting when the contents of a cache memory location in a coupled data processor have been changed in conjunction with the operation of said coupled data processor, and means for generating cache change signals representative of said detections, means for communicating said cache change signals to said other data processors.

* * * * *